United States Patent
Black et al.

(10) Patent No.: US 9,246,698 B2
(45) Date of Patent: Jan. 26, 2016

(54) APPARATUS, AND ASSOCIATED METHOD, FOR FACILITATING A RADIO RESOURCE MEASUREMENT IN A RADIO COMMUNICATION SYSTEM

(75) Inventors: Simon A. Black, Stretham (GB); Jonathan Edney, Willingham (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 834 days.

(21) Appl. No.: 11/121,746

(22) Filed: May 4, 2005

(65) Prior Publication Data

US 2005/0250495 A1 Nov. 10, 2005

Related U.S. Application Data

(60) Provisional application No. 60/569,416, filed on May 7, 2004.

(51) Int. Cl.
*H04W 4/00* (2009.01)
*H04L 12/26* (2006.01)
(Continued)

(52) U.S. Cl.
CPC ............ *H04L 12/2697* (2013.01); *H04L 43/50* (2013.01); *H04W 24/10* (2013.01); *H04W 72/00* (2013.01); *H04W 72/08* (2013.01); *H04W 84/12* (2013.01)

(58) Field of Classification Search
CPC ..... H04W 88/08; H04W 24/10; H04W 72/00; H04W 72/08; H04W 84/12; H04L 43/06; H04L 12/2697; H04L 43/50

USPC ................ 455/67, 434, 422.1, 423, 436, 226, 455/161.3, 133–136, 510, 513, 67.3, 455/66.117, 450, 452.1, 452.2; 370/252, 370/253, 232, 233, 234, 331–334
See application file for complete search history.

(56) References Cited

U.S. PATENT DOCUMENTS 5,228,066 A * 7/1993 DeVane .......................... 377/20
5,752,192 A * 5/1998 Hamabe ........................ 455/450
(Continued)

FOREIGN PATENT DOCUMENTS

EP 1227694 A1 7/2002
JP 63 104193 5/1988
(Continued)

OTHER PUBLICATIONS

IEEE Std 802.11h-2003 http://standards.ieee.org/getieee802/download/802.11h-2003.pdf.*
(Continued)

*Primary Examiner* — Wayne Cai
(74) *Attorney, Agent, or Firm* — Alston & Bird LLP

(57) ABSTRACT

Apparatus, and an associated method, for requesting a measurement to be performed at a communication station of a radio communication system, such as a WLAN. A measurement request message is generated at a requesting station. The measurement request message includes fields identifying a selected measurement type and a field identifying a duration period for which the measurement is requested to be made. The duration period is mandatory or non-mandatory. The request message is communicated to a communication station whereat the message is detected and the values contained therein are identified. Selection is made at the communication station to which the message is delivered whether to perform the requested measurement for the requested duration period. If the requested duration period is non-mandatory, the communication station is able to select a duration period of lesser length during which to perform the requested measurement.

39 Claims, 5 Drawing Sheets

(51) Int. Cl.
*H04W 24/10* (2009.01)
*H04W 72/00* (2009.01)
*H04W 72/08* (2009.01)
*H04W 84/12* (2009.01)

(56) References Cited

U.S. PATENT DOCUMENTS

| | | | | |
|---|---|---|---|---|
| 5,774,807 | A * | 6/1998 | Yazaki et al. | 455/434 |
| 5,857,153 | A * | 1/1999 | Lupien | 455/436 |
| 6,434,364 | B1 * | 8/2002 | O'Riordain | 455/67.11 |
| 6,807,163 | B1 * | 10/2004 | Shi | 370/337 |
| 6,985,465 | B2 * | 1/2006 | Cervello et al. | 370/333 |
| 2001/0019956 | A1 * | 9/2001 | Tada | 455/434 |
| 2001/0031626 | A1 * | 10/2001 | Lindskog et al. | 455/67.3 |
| 2002/0188723 | A1 | 12/2002 | Choi et al. | |
| 2005/0054294 | A1 * | 3/2005 | Khun-Jush et al. | 455/63.1 |

FOREIGN PATENT DOCUMENTS

| | | |
|---|---|---|
| WO | WO03/077482 A1 | 9/2003 |
| WO | WO 2004/100451 | 11/2004 |
| WO | WO2004/100451 A1 | 11/2004 |
| WO | WO2005/109760 | 11/2005 |

OTHER PUBLICATIONS

International Search Report for PCT/IB2005/001218, dated Sep. 9, 2005.
Black, "Measurement Duration in IEEE 802.11k," Document IEEE 802.11-04/559R1, May 2004, pp. 1-9.
Black, "IEEE P802.11, Wireless LANS: Measurement Duration," Document IEEE802.11-04/560R0, May 10, 2004, pp. 1-7.
Kwak, et al. "IEEE P802.11, Wireless LANs: Proposed Normative Text for Repeated Measurement Request Frames," Internet Citation, No. 802.11-05/0071r1, Jan. 20, 2005, pp. 1-19.
Paine, IEEE P802.11, Wireless LANs: 11k Draft 0.9 Review Comments, Document IEEE802.11-04/000R0, Jan. 2004, pp. 1-33.
Cervello, et al. "IEEE P802.11, Wireless LANS: Dynamic Channel Selection (DCS) Scheme for 802.11," Document IEEE802.11-00/195, Jul. 12, 2000, pp. 1-7.
"IEEE 802.11h: Amendment 5: Spectrum and Transmit Power Management Extensions in the 5GHz band in Europe," Document IEEE Std 802.11H, Oct. 14, 2003, pp. 1-59.
Office Action dated Feb. 6, 2009, European Patent Application 05 737 489.4.
Supplemental Search Reported dated Feb. 12, 2009, European Patent Application 08166033.4.
Malaysia Search Report dated Jul. 25, 2008, Application No. PI 20052042, Filed Jun. 5, 2005.
Office Action, dated Apr. 2, 2010, of corresponding Chinese Patent Application 200810169018.9.
Office Action, dated Dec. 14, 2010, of corresponding Chinese Patent Application 200810169018.9.
Office Action, dated Jun. 27, 2008, of corresponding Chinese Patent Application 200580020593.7.
Office Action, dated Dec. 18, 2009, of corresponding Chinese Patent Application 200580020593.7.
Goverment of India Patent Office, First Examination Report for Application No. 9090/DELNP/2008, Nov. 11, 2014, 2 pages, India.
Office Action, dated Apr. 8, 2011, of corresponding Japanese Patent Application 2008-262488.

* cited by examiner

APPARATUS, AND ASSOCIATED METHOD, FOR FACILITATING A RADIO RESOURCE MEASUREMENT IN A RADIO COMMUNICATION SYSTEM

The present invention claims the priority of provisional patent application No. 60/569,416 filed on 7 May 2004, the contents of which are incorporated herein by reference.

The present invention relates generally to a manner by which to facilitate measurement of radio resource information used to facilitate communications in a radio communication system, such as a wireless local area network operable in conformity with the operating protocols of a variant of an IEEE 802.11 communication standard. More particularly, the present invention relates to apparatus, and an associated method, by which to request and to obtain radio resource measurement information measured by a communication station that operates in the radio communication system.

A measurement request is generated at a first communication station and sent to a second communication station whereat the measurement is to be performed. The measurement request identifies the type of measurement that is requested and the measurement period during which the measurement is requested to be made. The measurement period is, selectably, mandatory or suggested. When delivered to the second communication station, determination is made whether the measurement can be made for the full period indicated in the request. If so, the measurement is performed. And, if not, further determination is made whether to perform the requested measurement during a lesser time period, depending on whether, or not, the measurement request mandates a selected time period or whether measurements during a lesser time period is adequate.

BACKGROUND OF THE INVENTION

Advancements in communication technologies have permitted the development, installation, and use of new types of communication systems. Their use is an endemic aspect of modern society, and use of such communication systems through which to communicate data is a practical necessity for many.

The advancements have been incorporated, for instance, in radio communication systems. In a radio communication system, communication channels that interconnect the communication stations operable therein are formed upon radio links rather than upon wireline connections. Because radio links are utilized upon which to form the communication channels, the need to establish conventional wireline connections between the communication stations of a conventional wireline communication system are obviated. A radio communication system, free of the need to form wireline connections between the sending and receiving stations of the communication system, is permitting of communications between locations at which formation of wireline connections between the communication stations would not be possible. Additionally, a radio communication system is amenable for implementation as a mobile communication system in which one or more of the communication stations is provided with communication mobility.

Many communication systems make use of digital communication techniques. Use of digital communication techniques permits data to be communicated more efficiently than when communicated through the use of analog communication techniques. A radio communication system is typically bandwidth-constrained. That is to say, a radio communication system is typically provided with only a limited bandwidth allocation upon which to define radio channels. There is, therefore, generally a particular need in a radio communication system to utilize the spectrum allocated thereto in an efficient manner, thereby to maximize the communication capacity of the communication system. In a communication system that utilizes digital communication techniques, information that is to be communicated is digitized. In one common technique, the digitized information is formatted into packets according to a selected packet formatting scheme. And, the packets are communicated to effectuate the communication. Individual ones, or groups, of the packets are communicated, sometimes at discrete intervals. Once delivered to a receiving station, the data packets are arranged in order and concatenated together. And, the informational content of the communicated data is recreated.

Communication systems that utilize packet-formatted data include conventional LANs (Local Area Networks). Wireless networks, operable in manners analogous to wired LANs have also been developed. And, these wireless networks, referred to WLANs (Wireless Local Area Networks), are utilized to communicate data packets by way of radio channels defined upon a radio link, thereby to effectuate communications between communication stations that are parties to a communication session.

WLANs, as well as other types of communication systems, are sometimes constructed to be operable in conformity with a variant of an IEEE (Institute of Electrical and Electronic Engineers) 802.11 operating standard. Various aspects of the operating protocols are undergoing consideration for inclusion in the operating standard.

For instance, proposals related to radio resource measurement procedures are being solicited and considered for inclusion in the operating standard. Radio resource management operations are facilitated through the measurement of various measurement parameters. And, by facilitating improved radio resource management, improved communication operations in the communication system are possible.

In an existing promulgation of the operating standard, protocols relating to manners by which to request or communicate radio resource measurements are unspecified. Radio resource measurements are sometimes requested by one communication station of the WLAN to be performed by another communication station of the WLAN. For instance, requests are made by a fixed-network access point of a mobile station for the mobile station to make measurements. And, measurements are sometimes requested by a mobile station to be made by an access point. And, sometimes requests are made of a mobile station for another mobile station to make radio resource measurements.

Some measurement values are of significance, or of increased significance, when the duration of the measurement is known. That is to say, a measurement period is regularly associated with a measurement value. And for a measurement value to have meaning, the measurement value must be measured for at least a designated time period. A radio signal strength measurement value is averaged over a time period to obtain a better sampling of the signal strength level. Other measurement values analogously are also of increased utility when measured over a time period. A radio resource measurement request should, therefore, specify not only the measurement that is to be made, but also the time period, i.e., the duration, during which the measurement is to be made.

While the measurement quality of the measurement value is generally increased when measured over a longer measurement period, the availability of a communication station at which the measurement is to be made to make the measurement might be limited. If the requested measurement period is unacceptably lengthy, the communication station at which the measurement is to be made elects not to perform the measurement. That is to say, if the requesting station makes a measurement request for measurement of a value over too long of a measurement duration, the requested station is unable to comply with the request and rejects the measurement request.

If a measurement request is rejected, a subsequent request can be made by the requesting communication station that identifies a less lengthy measurement period. And, the requested communication station, elects whether or not to perform the measurement over the less lengthy measurement. Multiple iterations of the procedure might be carried out prior to selection to perform the measurement during an acceptable measurement period. This trial and error procedure is inherently inefficient, resource-consumptive, and time-consuming.

An improved radio resource measurement procedure is therefore required.

It is in light of this background information related to radio resource measurements in a radio communication system that the significant improvements of the present invention have evolved.

SUMMARY

The present invention, accordingly, advantageously provides apparatus, and an associated method, by which to facilitate measurement of radio resource information used to facilitate communications in a radio communication system, such as a wireless local area network operable in conformity with a variant of the IEEE 802.11 communication standard.

Through operation of an embodiment of the present invention, a manner is provided by which to request and to obtain radio resource measurement information measured by a communication station that operates in the radio communication system.

In one aspect of the present invention, a measurement request is generated at a first communication station, the requesting station, and sent to a second communication station, the requested station, whereat the measurement is to be performed. The measurement request, generated at the requesting station, identifies the type of measurement that is requested to be performed at the requested station and also a measurement period during which the measurement is requested to be made.

The measurement period that is identified in the measurement request generated by the requesting communication station is mandatory or bolitive, i.e., non-mandatory. When the identified measurement period is mandatory, the duration of the measurement period during which the requested communication station is to perform the requested measurement is mandated by the requesting station. If the requested station is unable to perform the requested measurement for the identified measurement period, the requesting station, by making its measurement period request mandatory, indicates that the requesting station would prefer not to utilize measurement results, measured over a lesser period of time than that indicated in the mandatory, requested measurement period if the requested communication station is unable to perform the measurement for the entirety of the requested measurement period. Conversely, if the measurement period identified in the request is non-mandatory, and only suggested, the requested communication station, if unable to perform the requested measurement for the entirety of the requested measurement period, selectably performs the requested measurement during a less lengthy measurement period.

In another aspect of the present invention, when a message, containing the measurement request generated by the requesting station is delivered to, and detected at, the requested communication station, the communication station ascertains the type of measurement that is requested and also the measurement period that is requested. And, the requested communication station ascertains whether the requested measurement period is mandatory or suggested. Determination is made at the communication station of whether the requested measurement can be performed and, also, whether the requested measurement can be performed for the requested measurement period.

In the event that the requested communication station is able to, and elects to, perform the requested measurement for the entirety of the requested measurement period, the communication station performs the requested measurement, measured over a measurement interval corresponding to the entirety of the requested measurement duration period. If, however, the requested communication station is unable to, or selects not to, perform the requested measurement for the entirety of the requested measurement period, additional determination is made whether the requesting communication station is permitting of measurements performed during a lesser time period than that requested. That is to say, the communication station determines whether the requested time period contained in the measurement request message is mandatory or non-mandatory. If the measurement period is mandatory, the communication station rejects the measurement request and does not perform the requested measurement. In one implementation, a rejection message is further returned to the requesting communication station. If, however, the requested measurement period is non-mandatory, the requested communication station further determines for what period that the requested communication station is able to perform the requested measurement. And, if the requested communication station is able to perform the requested measurement during a lesser time period, the requested communication station elects to perform the requested measurement during the available time period.

In a further aspect of the present invention, the communication station at which the measurements are made generates a measurement report for return to the requesting communication station that reports upon the measurements made by the requested communication station. Additional information is selectably further identified in the response message, such as an indication of the duration of the measurement period during which the measurement was made if the measurement duration is less than the requested measurement period.

In one implementation, measurements are requested and performed in a radio communication system operable in conformity generally with a variant of an IEEE 802.11 operating specification, such as a wireless local are network. In a WLAN, a fixed infrastructure includes fixed-site transceivers, sometimes referred to as access points, with which mobile stations communicate. The access points and the mobile stations each are capable of forming a requesting station. And, each of the access points and mobile stations are also capable of forming a requested station. When an access point forms a requesting station, a request message is generated at the access point and communicated to a mobile station forming a requested station. Measurement operations are selectably performed at the mobile station, and, if a measurement operation is performed at the mobile station, a response message is generated for return to the access point. When the mobile station forms a requesting station, a request message is generated thereat and communicated to a requested station, either an access point or another mobile station. And, the communication station that forms the requested station selectably performs the requested measurement and returns a response message, at least in the event that the requested station performs the requested measurement.

The message request (also referred to herein as measurement request message) indicates if the measurement period is mandatory. Or, conversely, the message indicates that requested measurement period is to be a non-mandatory measurement period. (See e.g., FIG. 4B) If non-mandatory, the requested station is able to perform the requested measurement during an abbreviated measurement period, and the requested station is able only to, or selects only to, perform the measurement during an abbreviated time period. Selection is made at the requested station without the need for additional signaling with the requesting station, reducing the overhead signaling required pursuant to the radio resource measurement procedures and thereby also reducing the time required to select a duration of measurement if a requested duration period is not performed by the requested station.

In these and other aspects, therefore, apparatus, and an associated method, is provided for a first communication station. A message generator is embodied at the first communication station. The message generator generates a measurement request message. The measurement request message is formatted to include a measurement-field for identifying a selected type of measurement and a first duration-length field for identifying a first measurement duration period. A field populator populates the measurement-type and first duration-length fields of the measurement request message with values that identify the selected type of measurement and the first measurement duration period.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
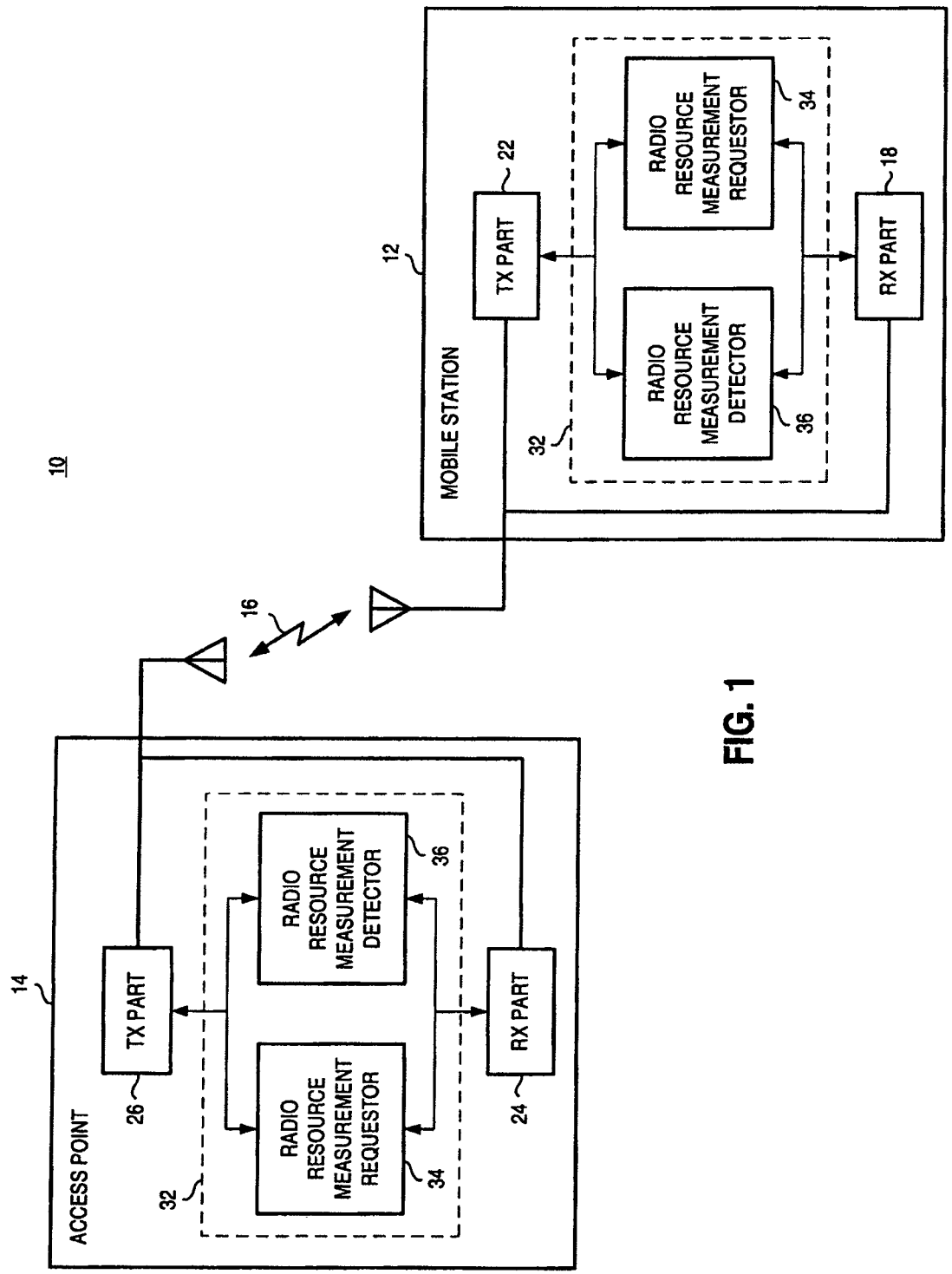
FIG. 1 illustrates a functional block diagram of an exemplary radio communication system in which an embodiment of the present invention is operable.

Referring first to FIG. 1, a radio communication system, shown generally at 10, provides for radio communications with mobile stations, of which the mobile station 12 is representative. In the exemplary implementation, the radio communication system forms a wireless local area network (WLAN) that operates generally in conformity with a variant of the IEEE 802.11 operating specification. In a wireless local area network, communications are effectuated with a mobile station by fixed-site radio transceivers, referred to as access points, that form part of the network infrastructure of the WLAN. The communication station 14 is representative of an exemplary access point of the wireless local area network.

More generally, the radio communication system is representative of any of various types of communication systems in which data is communicated between communication stations interconnected by way of a radio channel. Accordingly, while the following description shall describe exemplary operation of an embodiment of the present invention with respect to its implementation in a wireless local area network, it should be understood that the teachings of the present invention are analogously implementable in communication systems of other constructions and operable pursuant to other operating standards.

The radio channels upon which the data is communicated are defined by a radio air interface extending between the communication stations 12 and 14. Here, the arrow 16 is representative of the radio channels upon which the data is communicated by the communication stations during communication operations.

Each of the communication stations, i.e., the mobile station and the access point, includes radio transceiver circuitry for transceiving communication data. The radio transceiver circuitry of the mobile station is here represented by a receive part 18 and a transmit part 22. And, the radio transceiver circuitry of the access point is here represented by a receive part 24 and a transmit part 26. The second exemplary mobile station 12 is also represented to include radio transceiver circuitry represented by a receive part 18 and a transmit part 22. The transceiver circuitry of the communication stations of the communication system are operable in general conformity with the protocols and parameters set forth in the IEEE 802.11 operating specification. That is to say, communication data originated at, or otherwise provided to, the network infrastructure part of the communication system is transmitted by the transmit part of the access point to an appropriate one, or more, of the mobile stations 12. And, the receive parts of the mobile stations operate to detect and operate upon data communicated thereto. Analogously, communication data originated at a mobile station is caused to be transmitted by the transmitter parts thereof for communication to an access point 14. And the receive parts of the access points operate to detect and operate upon the communication data sent thereto. And, sets of mobile stations also are capable of forming communication endpoints. That is, communication data originated at one mobile station is terminated at another mobile station. In a conventional WLAN, communication data communicated between mobile stations are communicated by way of the network infrastructure.

As noted previously, measurement of various radio resource indicia facilitates radio resource management and permits improvement of communication operations in the communication system. Existing mechanisms and procedures by which to request and to effectuate the radio resource measurement is susceptible to undesirably high levels of signaling overhead and time delay. Pursuant to an embodiment of the present invention, the communication stations 12 an 14 of the communication system 10 include apparatus 32 that facilitates radio resource measurement operations so that the radio resource measurements are able to be more timely made than using conventional schemes and in a manner that is potentially less signaling-overhead intensive. The apparatus is functionally represented, implementable in any desired manner, such as by algorithms executable by processing circuitry.

The apparatus 32 represented in the figure is of an exemplary implementation in which the apparatus embodied at each of the communication stations are permitting a generation of a radio resource measurement request. And, the apparatus embodied at each of the communication stations is also capable of accepting, rejecting, or modifying a radio resource measurement request. Elemental portions of the apparatus, in other implementations, comprise the apparatus 32. That is to say, in a simplified implementation, the apparatus 32 includes an elemental portion for generating a request or an elemental portion for detecting and operating upon a request.

Accordingly, here, the apparatus 32 embodied at the access point 14 includes both an element 34 that operates to form a radio resource measurement request, and an element 36 that operates to detect and operate upon a radio resource measurement request. And, the apparatus 32 embodied at the mobile stations 12 also include the elements 34 and 36. An element 34 embodied at the access point 14 operates in conjunction with an element 36 embodied elsewhere, such as at the mobile stations or at another access point (not shown in the figure). And, the element 36 of the apparatus 32 embodied at the access point 14 detects a request generated elsewhere, such as at one of the mobile stations or at another access point (not shown in the figure) and delivered to the access point 14. The elements 34 and 36 of the apparatus 32 embodied at a mobile station are analogously operable in conjunction with associated elements positioned elsewhere. That is to say, an element 34 of the apparatus 32 embodied at a mobile station 12 causes formation of a radio resource request message for transmission to another location, such as an access point 14 or another mobile station 12, by way of an access point 14. And, an element 34 of the apparatus 32 embodied at the mobile station operates to detect and operate upon a request communicated to the mobile station 12 from elsewhere.

Figure 2:
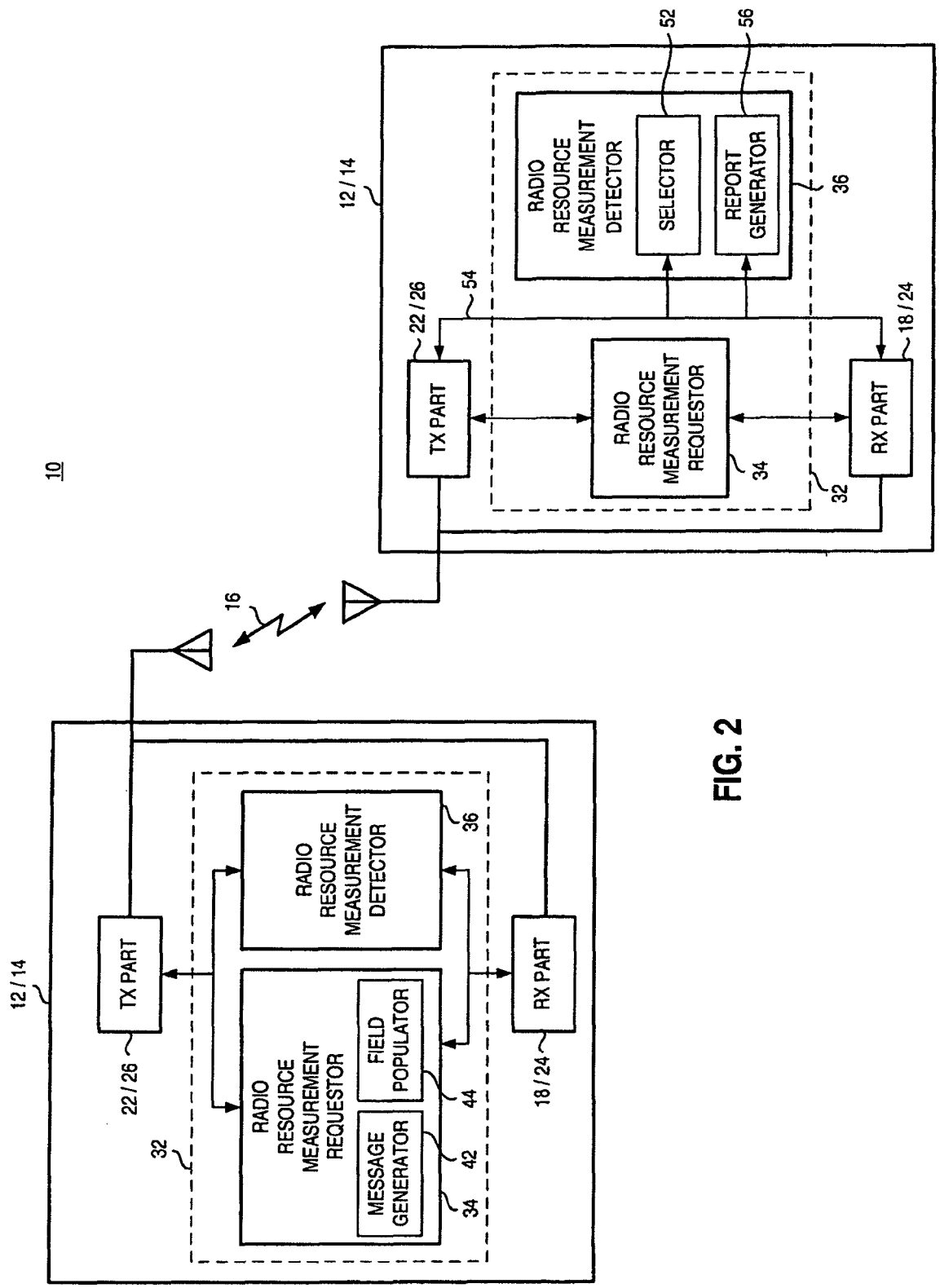
FIG. 2 illustrates a functional block diagram of a set of communication stations in which an embodiment of the present invention is deployed.

FIG. 2 illustrates a set of communication stations of the communication system 10, shown in FIG. 1. The communication stations, shown at 12/14, as each of the communication stations shown in the figure is representative of either a mobile station or an access point. The left-most (as shown) communication station forms a requesting station, and the right-most (as shown) communication station forms a requested station. The requesting station includes the apparatus 32 of an embodiment of the present invention, and the requested station also includes the apparatus 32 of an embodiment of the present invention. And, the arrow 16 is again representative of the radio channels defined upon a radio air interface formed between the communication stations.

During operation of the communication system, a decision is made at, or provided to, the requesting station that a measurement of a radio resource parameter or indicia should be made at a remote station, i.e., the requested station, the element 34 causes a radio resource request message to be generated. The element 34 includes a message generator 42 that generates a measurement request message 100 (also referred to herein as request message) that includes, amongst other things, fields that identify the type of measurement 102 (also referred to herein as measurement type field) that is being requested and a field that identifies the duration period 104 (also referred to herein as measurement period duration or first measurement duration period) during which the requested measurement is to be made. (See e.g., FIG. 4B) And, the element includes a field populator 44 that populates the fields of the request message with values that identify the requested measurement and the requested duration thereof. The requested duration is either a mandatory duration or a non-mandatory, but suggested, duration. Once formed and populated with values, the request message is provided to a transmit part 22/26, and the message is caused to be communicated by the requesting station for delivery to the requested station. The measurement request message communicated to the requested station thereby identifies both the type of measurement that is requested to be made at the requested station as well as the duration period during which the measurement is requested to be made that is selectably of a mandatory or non-mandatory duration.

The message, is delivered to a receive part 18/24 of the requested station and operated upon thereat. The detector 36 of the apparatus 32 embodied at the requested station is coupled to the receive part. The detector 36 (also referred to herein as response detector) operates to detect the values populating the fields of the measurement request message. And, the detector 36 also includes a selector 52 coupled to receive indications of the values detected during operation of the detector 36. The selector operates to select whether to perform the measurement requested in the request message for the duration period identified in the request message. Selection is made, for instance, based upon other operations that must be performed at the requested station. For instance, the requested station may not have the capacity to perform normal sending and receiving operations during the performance of the measurements during the duration period. If selection is made not to perform the requested measurement for the entire duration of the requested duration period, the selector further determines whether the requested period is a mandatory period or whether the requested duration period is bolitive, i.e., suggested.

If the duration period is suggested, the selector further determines whether to select that the requested measurement be performed for a lesser period of time. In one implementation, the duration period of the request message, when the measurement duration period is non-mandatory, identifies both a suggested measurement period and a minimum measurement period identifying a minimum measurement period acceptable to the requesting station. When the request message includes both values, the selector takes the values into consideration in its determination and selection of a lesser duration period during which to perform the requested measurement. In any event, when the duration period is non-mandatory, the selector is capable of selecting a lesser-length duration period during which to perform the requested measurement. If selection is made to perform the requested measurement during the lesser-length measurement period, the selector causes the measurement to be performed for the selected measurement period of the reduced duration period.

The line 54 is representative of commands generated by the selector that cause operation of parts of the requested station, such as the receive or transmit part, to perform the requested measurements. And, once the measurements are made, a report generator 56 generates a measurement report for return to the requesting station. The report message generator also, in one implementation, generates a request denial message for return to the requesting station in the event that the requested measurement is not performed at the requested station. And, in a further implementation, when the report message is generated, the report message also indicates the duration period identifying the duration length of the measurement period during which the requested measurement is made.

The response message or refusal indication is provided to the transmit part 22-26 and caused to be returned to the requesting station by way of a radio channel defined upon the radio air interface.

The response message is delivered to the requesting station, operated upon by the receive part 18/24 thereof, and a response message detector 36 operates upon values of the response.

The apparatus 32 thereby provides a manner by which to request of a requested station measurement of a selected radio resource indicia for a requested measurement. In the event that the measurement period is non-mandatory, and the requested station is unable to perform the requested measurement for the entire duration of the requested measurement period, the requested station is able to select a lesser-length measurement period without additional signaling between the requesting and requested station. Reduced levels of signaling overhead and time delay conventionally required pursuant to such operation is provided.

Figure 3:
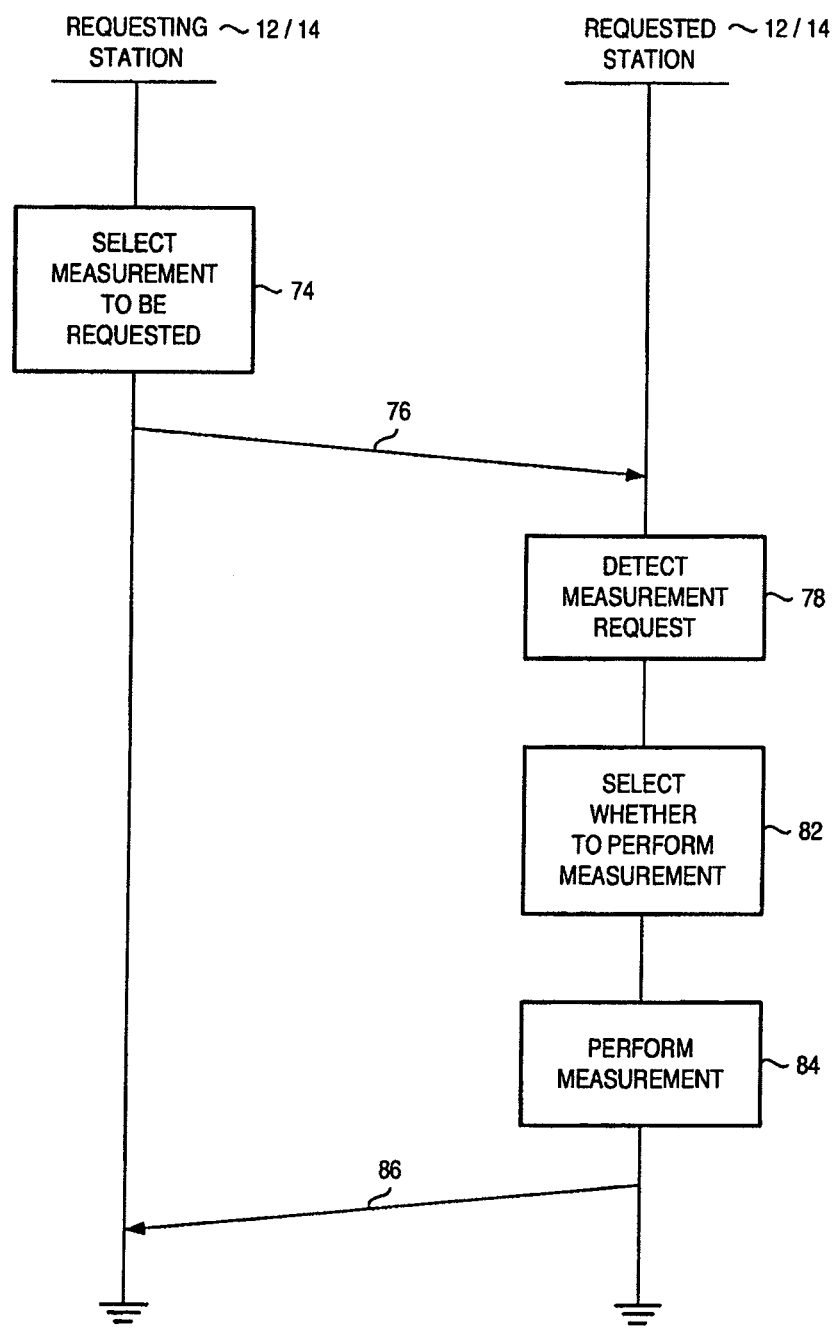
FIG. 3 illustrates a message sequence diagram representative of signaling generated during operation of the radio communication system shown in FIG. 1 pursuant to an embodiment of the present invention.

FIG. 3 illustrates a message sequence diagram, shown generally at 72, representative of the signaling generated during operation of the radio communication system 10, shown in FIGS. 1 and 2, pursuant to operation of an embodiment of the present invention. The communication stations are again represented in terms of requesting and requested stations 12/14 in which either a mobile station or an access point forms the requesting station, and either an access point or a mobile station forms the requested station.

First, and as indicated at the block 74, selection is made of what measurement to request and for what duration to request that the requested measurement be made. Selection is further made as to whether the duration period forms a mandatory period or a suggested period. A request message is generated and then sent, indicated by the segment 76, to the requested communication station. Once delivered to the requested communication station, the values contained in the request message are detected, indicated by the block 78, and selection, indicated by the block 82, is made of whether to perform the requested measurement and, if so, during what duration period. Selection of whether to perform the requested measurement is, at least in part, dependent upon resources available at the requested station to perform the requested measurement for the entire length of the requested duration period. If the requested station is unable to perform the requested measurement for the entire duration of the requested duration period, a lesser-length duration period is selected if possible. That is to say, if the requested measurement duration period is non-mandatory and resources are available at the requested station to perform the requested measurement for a lesser-length duration period, selection is made to make the measurement during the duration period of the lesser length. If selection is made to perform the requested measurement, the measurement is performed, indicated by the block 84, and a response message, a measurement report, is created and returned, indicated by the segment 86, to the requesting station. In the event that the requested measurement is not performed, no measurement is made at the block 84, and the response 86 is a denial of the request.

Figure 4A:
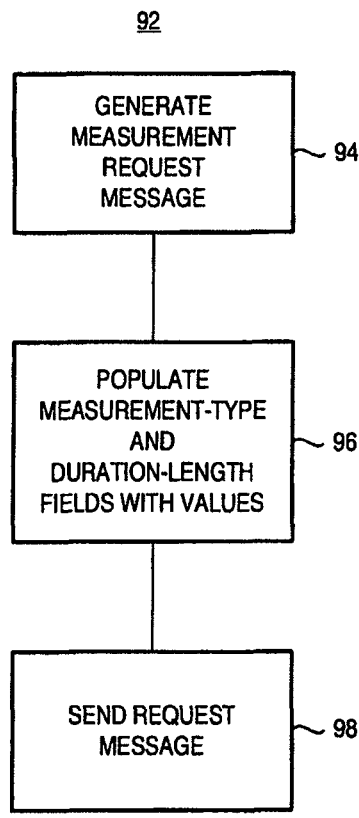
FIG. 4A illustrates a method flow diagram listing the method of operation of an embodiment of the present invention and FIG. 4B illustrates an example embodiment of a measurement request message.
Figure 4B:
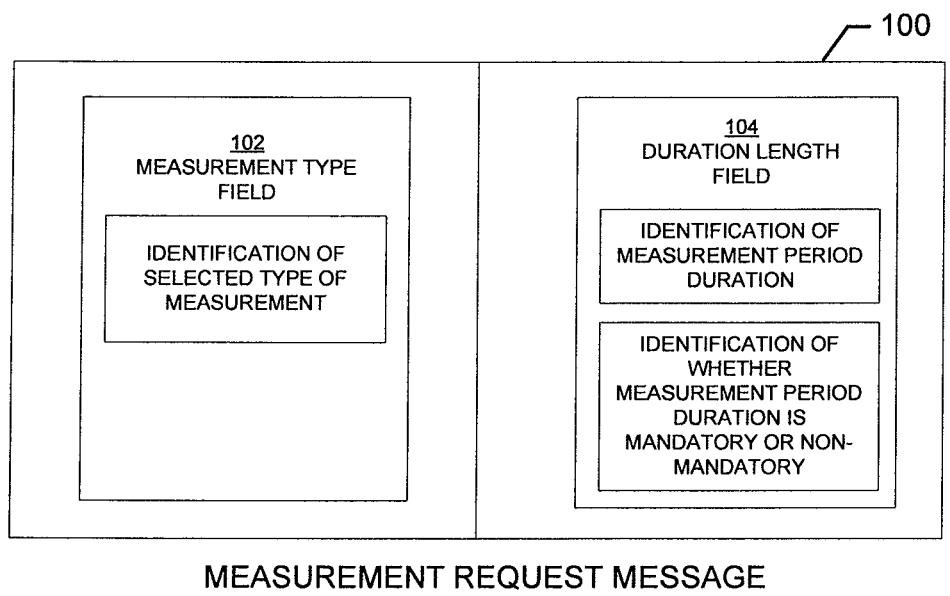

FIG. 4A illustrates a method flow diagram, shown generally at 92, representative of the method of operation of an embodiment of the present invention. The method is for obtaining remote measurement information at a first communication station.

First, and as indicated by the block 94, a measurement request message 100 is generated. The measurement request message is formatted to include a measurement-type field 102 and a first duration-length field 104. The measurement-type field is for identifying a selected type of measurement. And, the first duration-length field is for identifying a first measurement duration period.

Then, and as indicated by the block 96, the measurement-type field and the first duration-length field are populated with values identifying the selected type of measurement and the first measurement duration period. Then, and as indicated by the block 98, the request message is sent to a second communication station whereat the measurement, requested in the request message is selectably performed during the selected measurement period.

Signaling overhead and time delays sometimes associated with measurement requests is a conventional scheme are obviated.

The previous descriptions are of preferred examples for implementing the invention, and the scope of the invention should not necessarily be limited by this description. The scope of the present invention is defined by the following claims.

We claim:

1. An apparatus comprising processing circuitry configured to execute stored algorithms, the execution of which causes the apparatus to:
   generate a measurement request message, said measurement request message comprises a measurement type field which identifies a selected type of measurement and a duration length field which identifies a measurement period duration;
   determine whether the measurement period duration is mandatory or non-mandatory;
   determine that a length of a measurement period is equal to a length of the measurement period duration specified in the duration length field in an instance in which a determination reveals that the measurement period duration is mandatory; and
   determine that the length of the measurement period is selectably less than the length of the measurement period duration in an instance in which a determination reveals that the measurement period is non-mandatory.

2. The apparatus of claim 1, wherein the processing circuitry for execution of the stored algorithms is further configured to cause the apparatus to:
   populate the measurement type field with values identifying the selected type of measurement; and
   populate the duration length field with values identifying the measurement period duration.

3. The apparatus of claim 2, wherein the measurement type field of the measurement request message generated by said apparatus comprises a selected length of the measurement period.

4. The apparatus of claim 3, wherein the processing circuitry for execution of the stored algorithms is further configured to cause the apparatus to:
   determine that the selected length of the measurement type field of the measurement request message is at least as great as a value-length of the values used to populate the measurement type field of the measurement request message.

5. The apparatus of claim 2, wherein the processing circuitry for execution of the stored algorithms is further configured to cause the apparatus to:
   facilitate communications with a device and wherein the measurement period duration identified in the duration length field of the measurement request message comprises the mandatory duration length of the measurement identified in the measurement type field requested by the apparatus to be performed by the device.

6. The apparatus of claim 5, wherein the device determines whether to modify the measurement request message.

7. The apparatus of claim 2 wherein the processing circuitry for execution of the stored algorithms is further configured to cause the apparatus to:
   facilitate communications with a device and wherein the first measurement duration period identified in the duration length field of the measurement request message comprises the non-mandatory duration length of the measurement identified in the measurement type field requested by the apparatus to be performed by the device.

8. The apparatus of claim 7 wherein the processing circuitry for execution of the stored algorithms is further configured to cause the apparatus to:
   selectably format the measurement request message to comprise a second duration length field for identifying a second measurement indicia; and
   selectably populate the second duration length field with values identifying the second measurement indicia.

9. The apparatus of claim 8 wherein the processing circuitry for execution of the stored algorithms is further configured to cause the apparatus to:
   identify that the duration length field of the measurement request message comprises a duration length of the measurement identified in the measurement type field requested by the apparatus to be performed by the device, and wherein the second measurement indicia comprises a value to indicate whether the first measurement duration period is mandated by the apparatus.

10. The apparatus of claim 9, wherein the second measurement indicia comprises a first value when the measurement duration period is mandated by the apparatus and is otherwise an other value.

11. The apparatus of claim 9, wherein the second measurement indicia comprises a second measurement duration period and wherein the value of the second measurement duration period populated in the second duration length field by said apparatus comprises a magnitude less than the values of the first measurement duration period populated in the duration length field.

12. The apparatus of claim 11 wherein the value of the measurement period duration identifies a desired duration period and wherein the value of the second measurement duration period defines a minimum duration period.

13. The apparatus of claim 12, wherein the desired duration period comprises a duration that is longer than the minimum duration period.

14. The apparatus of claim 7, wherein the device determines whether to modify the measurement request message.

15. The apparatus of claim 1, wherein the processing circuitry for execution of the stored algorithms is further configured to cause the apparatus to detect a response delivered to the apparatus responsive to the measurement request message.

16. The apparatus of claim 1, wherein the non-mandatory duration length comprises information identifying a suggested measurement period and a minimum measurement period, the minimum measurement period identifies a minimum measurement period acceptable to a device.

17. The apparatus of claim 1, wherein the processing circuitry for execution of the stored algorithms is further configured to cause the apparatus to:
   facilitate communications with a device; and
   determine whether the measurement period duration is mandatory or non-mandatory based on resources available at the device.

18. The apparatus of claim 17, wherein the processing circuitry for execution of the stored algorithms is further configured to cause the apparatus to:
   cause transmission of the measurement request message to the device in an instance in which the measurement period duration is mandatory, which enables the device to determine whether the measurement can be performed within the measurement period duration such that the device rejects the measurement request in an instance in which the measurement cannot be performed within the measurement period duration.

19. The apparatus of claim 1, wherein the processing circuitry for execution of the stored instructions is further configured to cause the apparatus to determine that the measurement request message comprises indicia indicating whether the measurement period duration is mandatory or non-mandatory.

20. An apparatus comprising processing circuitry configured to execute stored algorithms, the execution of which causes the apparatus to:
   detect delivery of a measurement request message, the measurement request message comprises a measurement type field populated with a value identifying a selected type of measurement and a duration length field populated with a value identifying a measurement period duration;
   receive indications of values populating the measurement type field and the duration length field of the measurement request message for selecting performance of the measurement at the apparatus in response to the detected measurement request message;
   determine whether the measurement period duration is mandatory or non-mandatory;
   perform the measurement during a length of a measurement period that is equal to a length of the measurement period duration specified in the duration length field in response to a determination that the measurement period duration is mandatory; and
   selectably perform the measurement during a period that is less than the length of the measurement period duration in response to a determination that the measurement period duration is non-mandatory.

21. The apparatus of claim 20 wherein, the measurement request message further comprises a duration mandatory field populated with a value identifying whether the value identifying the measurement duration period populating the duration length field comprises a mandatory duration length, and wherein the processing circuitry for execution of the stored algorithms is further configured to cause the apparatus to:
   select whether to perform the selected type of measurement for the measurement period duration in an instance in which the measurement period duration comprises the mandatory duration length.

22. The apparatus of claim 20 wherein the measurement request message further comprises a duration mandatory field populated with a value identifying whether the value identifying the measurement period duration populating the duration length field is to be interpreted to comprise a mandatory duration length, and wherein the processing circuitry for execution of the stored algorithms is further configured to:
   select to perform the selected type of measurement for an altered measurement duration period in an instance in which the measurement period duration is determined to comprise a non-mandatory duration length.

23. The apparatus of claim 20, wherein the processing circuitry for execution of the stored algorithms is further configured to cause the apparatus to:
   receive an indication of a selection; and
   generate a selection response message representative of the selection.

24. The apparatus of claim 23, wherein the selection response message comprises a measurement duration field populated with a value identifying an actual duration period of measurement of the selected type of measurement undertaken at the apparatus.

25. The apparatus of claim 20, wherein the processing circuitry for execution of the stored instructions is further configured to cause the apparatus to determine that the measurement request message comprises indicia indicating whether the measurement period duration is mandatory or non-mandatory.

26. An apparatus comprising:
means for generating a measurement request message, said measurement request message comprises a measurement type field that identifies a selected type of measurement and a duration length field that identifies a measurement period duration;
means for determining whether the measurement period duration is mandatory or non-mandatory;
means for determining that a length of a measurement period is equal to a length of the measurement period duration specified in the duration length field in response to determining that the measurement period duration is mandatory; and
means for determining that the length of the measurement period is selectably less than the length of the measurement period duration in response to determining that the measurement period duration is non-mandatory.

27. A computer program product; comprising at least one non-transitory computer-readable storage medium having computer-readable program code portions stored therein, the computer-readable program code portions comprising:
a first executable code portion configured to generate a measurement request message, the measurement request message comprises a measurement type field that identifies a selected type of measurement and a duration length field that identifies a measurement period duration;
a second executable portion configured to determine whether the measurement period duration is mandatory or non-mandatory;
a third executable portion configured to determine that a length of a measurement period is equal to a length of the measurement period duration specified in the duration length field in response to determining that the measurement period duration is mandatory; and
a fourth executable portion configured to determine that the length of the measurement period is selectably less than the length of the measurement period duration in response to determining that the measurement period duration is non-mandatory.

28. A method comprising:
generating a measurement request message at an apparatus comprising a measurement type field that identifies a selected type of measurement and a duration length field that identifies a measurement period duration;
populating the measurement type field with values identifying the selected type of measurement;
populating the duration length field with values identifying the measurement period duration;
determining, via processing circuitry, whether the measurement period duration is mandatory or non-mandatory;
performing the measurement during a length of a measurement period that is equal to a length of the measurement period duration specified in the duration length field in an instance in which a determination reveals that the measurement period duration is mandatory; and
selectably performing the measurement during a period that is less than the length of the measurement period duration in an instance in which a determination reveals that the measurement period duration is non-mandatory.

29. The method of claim 28, further comprising facilitating sending of the measurement request message to a device to request the selected type of measurement to be performed at the device.

30. The method of claim 28, further comprising:
facilitating communications with a device and wherein the measurement period duration identified in the duration length field of the measurement request message comprises a mandatory duration length of the measurement identified in the measurement type field requested by the apparatus to be performed by the device.

31. The method of claim 28, further comprising:
facilitating communications with a device and wherein the measurement period duration identified in the duration length field of the measurement request message comprises a non-mandatory duration length of the measurement type field requested by the apparatus to be performed by the device.

32. The method of claim 28, further comprising, selecting the measurement to form the selected measurement.

33. The method of claim 28, further comprising determining that the measurement request message comprises indicia indicating whether the measurement period duration is mandatory or non-mandatory.

34. A method comprising:
detecting delivery of a measurement request message comprising a measurement type field populated with a value identifying a selected type of measurement and a duration length field populated with a value identifying a measurement period duration;
selecting performance responsive to values populating the measurement type field and the duration length field of the measurement request message;
determining, via processing circuitry, whether the measurement period duration is mandatory or non-mandatory,
performing the measurement during a length of a measurement period that is equal to a length of the measurement period duration specified in the duration length field in an instance in which a determination reveals that the measurement period duration is mandatory; and
selectably performing the measurement during a length of a measurement period that is less than the length of the measurement period duration in an instance in which a determination reveals that the measurement period duration is non-mandatory.

35. The method of claim 34, further comprising determining that the measurement request message comprises indicia indicating whether the measurement period duration is mandatory or non-mandatory.

36. The method of claim 34, further comprising:
determining that the measurement request message comprises a duration mandatory field populated with a value identifying whether the value identifying the measurement period duration populating the duration length field is to be interpreted to comprise a mandatory duration length; and
selecting whether to perform the selected type of measurement for the measurement period duration in an instance in which the measurement period duration is interpreted to comprise the mandatory duration length.

37. The method of claim 34, further comprising:
determining that the measurement request message comprises a duration mandatory field populated with a value identifying whether the value identifying the measurement period duration populating the duration length field is to be interpreted to comprise a mandatory duration length; and selecting to perform the selected type of measurement for an altered measurement duration period in an instance in which the measurement period duration is determined to comprise a non-mandatory duration length.

38. The method of claim 34, further comprising:

receiving an indication of a selection; and generating a selection response message representative of the selection.

39. The method of claim 38, further comprising determining that the selection response message comprises a measurement duration field populated with a value identifying an actual duration period of measurement of the selected type of measurement undertaken at an apparatus.

* * * * *